United States Patent
Hagerty et al.

(10) Patent No.: US 7,858,719 B2
(45) Date of Patent: Dec. 28, 2010

(54) POLYMERIZATION PROCESS

(75) Inventors: Robert Olds Hagerty, Laporte, TX (US); Kevin B. Stavens, Seabrook, TX (US); Randall B. Laird, Pasadena, TX (US); Michael F. McDonald, Kingwood, TX (US); Pradeep P. Shirodkar, Stow, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 971 days.

(21) Appl. No.: 11/579,557

(22) PCT Filed: May 19, 2005

(86) PCT No.: PCT/US2005/017513

§ 371 (c)(1),
(2), (4) Date: Nov. 3, 2006

(87) PCT Pub. No.: WO2005/113610

PCT Pub. Date: Dec. 1, 2005

(65) Prior Publication Data

US 2008/0287615 A1  Nov. 20, 2008

Related U.S. Application Data

(60) Provisional application No. 60/572,876, filed on May 20, 2004, provisional application No. 60/572,786, filed on May 20, 2004, provisional application No. 60/581,463, filed on Jun. 21, 2004.

(51) Int. Cl.
C08F 2/34 (2006.01)
C08F 210/16 (2006.01)

(52) U.S. Cl. .............. 526/206; 526/68; 526/901
(58) Field of Classification Search ............... 526/206, 526/901, 913, 68
See application file for complete search history.

(56) References Cited

U.S. PATENT DOCUMENTS

| | | |
|---|---|---|
| 3,056,771 A | 10/1962 | Aldridge et al. |
| 3,082,198 A | 3/1963 | Klein |
| 3,354,139 A | 11/1967 | Vandenberg |
| 3,470,143 A | 9/1969 | Schrage et al. |
| 3,919,185 A | 11/1975 | Takebe et al. |
| 4,012,574 A | 3/1977 | Jones et al. |
| 4,194,073 A | 3/1980 | McDaniel |
| 4,232,140 A | 11/1980 | Ort |
| 4,593,010 A | 6/1986 | Malpass |
| 4,792,592 A | 12/1988 | Fulks et al. |
| 4,803,251 A | 2/1989 | Goode et al. |
| 4,855,370 A | 8/1989 | Chirillo et al. |
| 5,026,795 A | 6/1991 | Hogan |
| 5,066,736 A | 11/1991 | Dumain et al. |
| 5,352,749 A | 10/1994 | DeChellis et al. |
| 5,391,657 A | 2/1995 | Song et al. |

(Continued)

FOREIGN PATENT DOCUMENTS

EP  0 089 691  9/1983

(Continued)

*Primary Examiner*—Fred M Teskin

(57) ABSTRACT

The present invention relates to a gas phase process for polymerizing one or more hydrocarbon monomer(s) in the presence of a catalyst system and a fluorinated hydrocarbon, where the fluorinated hydrocarbon is present at a partial pressure of 6.9 to 348 kPa in the reactor and the reactor temperature is from 30 to 120° C.

64 Claims, 1 Drawing Sheet

U.S. PATENT DOCUMENTS

| | | | |
|---|---|---|---|
| 5,410,002 | A | 4/1995 | Govoni et al. |
| 5,624,878 | A | 4/1997 | Devore et al. |
| 5,677,375 | A | 10/1997 | Rifi et al. |
| 5,990,251 | A | 11/1999 | Gelus |
| 6,313,236 | B1 | 11/2001 | Ford et al. |
| 6,417,298 | B1 | 7/2002 | Ford et al. |
| 6,455,638 | B2 | 9/2002 | Laughner et al. |
| 6,534,613 | B2 | 3/2003 | Ford et al. |
| 6,646,073 | B2 | 11/2003 | Farrer et al. |
| 7,122,607 | B2 * | 10/2006 | Hagerty et al. ............... 526/73 |
| 7,300,987 | B2 * | 11/2007 | Hagerty et al. ............... 526/73 |
| 2001/0044505 | A1 | 11/2001 | Ford et al. |
| 2003/0100688 | A1 * | 5/2003 | Farrer et al. ............... 526/110 |
| 2003/0171512 | A1 | 9/2003 | Mawson et al. |

FOREIGN PATENT DOCUMENTS

| | | |
|---|---|---|
| EP | 0 453 116 | 10/1991 |
| EP | 0 549 252 | 6/1993 |
| EP | 0 722 955 | 7/1996 |
| EP | 0 754 708 | 1/1997 |
| EP | 1 323 746 | 7/2003 |
| WO | WO 97/14721 | 4/1997 |
| WO | WO 03/010211 | 2/2003 |
| WO | WO 2004/058825 | 7/2004 |
| WO | WO 2004/058827 | 7/2004 |
| WO | WO 2004/058828 | 7/2004 |
| WO | WO 2005/113610 | 12/2005 |
| WO | WO 2005/113615 | 12/2005 |
| WO | WO 2006/002132 | 1/2006 |
| WO | WO 2006/009942 | 1/2006 |
| WO | WO 2006/009944 | 1/2006 |
| WO | WO 2006/009945 | 1/2006 |
| WO | WO 2006/009946 | 1/2006 |
| WO | WO 2006/009949 | 1/2006 |
| WO | WO 2006/009951 | 1/2006 |
| WO | WO 2006/009976 | 1/2006 |
| WO | WO 2006/009977 | 1/2006 |
| WO | WO 2006/009979 | 1/2006 |
| WO | WO 2006/009980 | 1/2006 |
| WO | WO 2006/009981 | 1/2006 |
| WO | WO 2006/019494 | 2/2006 |
| WO | WO 2006/025917 | 3/2006 |
| WO | WO 2006/028549 | 3/2006 |
| WO | WO 2006/083303 | 8/2006 |

* cited by examiner

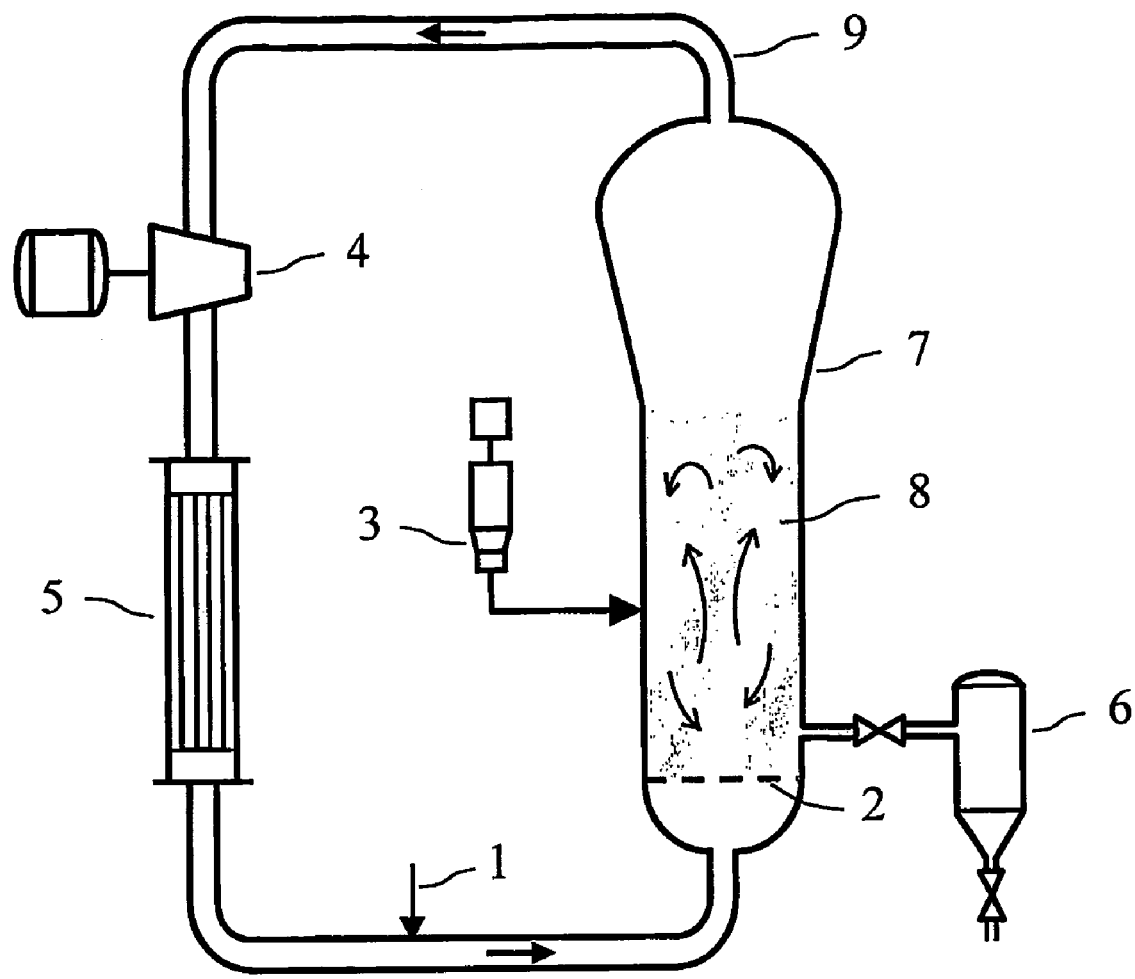

POLYMERIZATION PROCESS

PRIORITY CLAIM

This application claims benefit of U.S. Provisional Patent Application Ser. No. 60/572,876 filed May 20, 2004, U.S. Provisional Patent Application Ser. No. 60/572,786 filed May 20, 2004, and U.S. Provisional Patent Application Ser. No. 60/581,463 filed Jun. 21, 2004, and is the national phase entry into the United States Patent Office of international application number PCT/US2005/017513 filed May 19, 2005.

FIELD OF THE INVENTION

The present invention relates to a polymerization process. In particular, the invention is directed to a gas phase process for polymerizing one or more olefin(s) in the presence of a catalyst system and a fluorinated hydrocarbon.

BACKGROUND OF THE INVENTION

Advances in polymerization and catalysis have resulted in the capability to produce many new polymers having improved physical and chemical properties useful in a wide variety of superior products and applications. With the development of new catalysts, the choice of polymerization-type (solution, slurry, high pressure or gas phase) for producing a particular polymer has been greatly expanded. Also, advances in polymerization technology have provided more efficient, highly productive and economically enhanced processes. Regardless of these technological advances in the polyolefin industry, common problems, as well as new challenges still exist. For example, the tendency for a gas phase process to foul and/or sheet remains a challenge, which can particularly be dependent on the polymer being produced and the catalyst system employed.

Fouling, sheeting and/or static generation in a continuous gas phase process, in for example heat exchangers, distributor plates, and probes, can lead to the ineffective operation of various reactor systems. In a typical continuous gas phase process, a recycle system is employed for many reasons including the removal of heat generated in the process by the polymerization reaction.

Evidence of, and solutions to, various process operability problems, including fouling, sheeting, chunking, and agglomerating and static build up, have been addressed by many in the art. For example, U.S. Pat. Nos. 4,792,592, 4,803,251, 4,855,370 and 5,391,657 all discuss techniques for reducing static generation in a polymerization process by introducing to the process for example, water, alcohols, ketones, and/or inorganic chemical additives; PCT publication WO 97/14721 published Apr. 24, 1997 discusses the suppression of fines that can cause sheeting by adding an inert hydrocarbon to the reactor; U.S. Pat. No. 5,066,736 and EP-A1 0 549 252 discuss the introduction of an activity retarder to the reactor to reduce agglomerates; EP-A1 0 453 116 discusses the introduction of antistatic agents to the reactor for reducing the amount of sheets and agglomerates; U.S. Pat. No. 4,012,574 discusses the addition of a surface-active compound, a perfluorocarbon group, to the reactor to reduce fouling; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce fouling; U.S. Pat. No. 3,470,143 describes a reduction in fouling in mostly slurry processes for producing primarily elastomers using a fluorinated organic carbon compound.

Likewise, further evidence of, and solutions to, various process operability problems have been addressed by many in the art. For example, U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; U.S. Pat. No. 3,919,185 describes a slurry process using a nonpolar hydrocarbon diluent with a conventional Ziegler-Natta-type or Phillips-type catalyst and a polyvalent metal salt of an organic acid having a molecular weight of at least 300; U.S. Pat. No. 5,990,251 relates to increasing catalyst activity of a Ziegler-Natta-type catalyst by using very small quantities of a halogenated hydrocarbon, specifically a molar ratio between 0.001 and 0.15 of the halogenated hydrocarbon, particularly chloroform, to the metal of the catalyst, specifically titanium; U.S. Pat. No. 6,455,638 is directed to a polymer blend having components with different ethylene content, and U.S. Pat. No. 5,624,878 relates primarily to the use in polymerization of catalytic derivatives of titanium (II) and zirconium (II) metallocene-type complexes; both U.S. Pat. Nos. 6,455,638 and 5,624,878 mention generally, in passing, using in polymerization various solvents such as straight-chain hydrocarbons, cyclic and alicyclic hydrocarbons, perfluorinated hydrocarbons, aromatic and alkyl-substituted aromatic compounds, and mixtures thereof. U.S. Pat. No. 6,534,613 describes using a Ziegler-Natta-type catalyst in combination with a halogenated hydrocarbon, particularly chloroform, and an electron donor to produce polymers useful for making better quality films. EP 1 323 746 shows loading of biscyclopentadienyl catalyst onto a silica support in perfluorooctane and thereafter the prepolymerization of ethylene at room temperature. U.S. Pat. No. 3,056,771 discloses polymerization of ethylene using $TiCl_4/(Et)_3Al$ in a mixture of heptane and perfluoromethylcyclohexane, presumably at room temperature.

It has been unexpectedly found that, the practice of this invention allows higher concentrations of induced condensing agents and thus allows higher production rates without fouling.

Thus, it would be advantageous to have a gas phase polymerization process capable of operating continuously with enhanced reactor operability, or a polymerization process having the ability to produce an expanded range of product capabilities on a commercial scale.

SUMMARY OF THE INVENTION

The invention is directed to a process for polymerizing one or more monomer(s), preferably a gas phase process for polymerizing one or more olefin(s) in the presence of catalyst system or polymerization catalyst and a condensable fluid, preferably a condensable fluid comprising a fluorinated hydrocarbon, specifically this invention relates to a gas phase process for polymerizing one or more hydrocarbon monomer(s) in the presence of a catalyst system and a fluorinated hydrocarbon, where the fluorinated hydrocarbon is present at a partial pressure of 6.9 to 348 kPa in the reactor and the reactor temperature is from 30 to 120° C.

BRIEF DESCRIPTION OF THE FIGURE

FIG. 1 is a drawing of a typical gas phase process employing a recycle stream, where catalyst (3) and monomer feed (1) enter the gas phase reactor (7) and are swept above the distributor plate (2) into the fluidized mixing zone (8) where the monomer is polymerized into polymer that is then withdrawn via a discharge apparatus (6), at the same time a recycle stream (9) is withdrawn from the reactor (7) and passed to a compressor (4), from the compressor the recycle stream is passed to a heat exchanger (5), and thereafter the recycle stream is passed back into the reactor via the monomer feed (1).

DETAILED DESCRIPTION OF THE INVENTION

Introduction

The invention is generally directed toward a polymerization process, particularly a gas phase process for polymerizing one or more monomer(s) in the presence of a catalyst system. The invention also relates to a polymerization process having improved operability and product capabilities. It has been surprisingly discovered that using a fluorinated hydrocarbon in a gas phase polymerization process provides for a substantially improved polymerization process and the production of polymers at commercially acceptable production rates.

Also, it has been surprisingly discovered that these fluorinated hydrocarbons, some of which are polar, in a gas phase process do not result in a deactivation of a bulky-ligand metallocene-type catalyst or catalyst system.

While not wishing to be bound by any theory, it is believed that because the fluorinated hydrocarbon is much less soluble in the polymer being produced than typical liquids added to a gas phase polymerization process, the polymers produced are less sticky. As a result, lower density polymers having a higher comonomer content, and which are typically difficult to produce at high polymerization production rates, are now possible. Furthermore, utilizing a fluorinated hydrocarbon of appropriate boiling point (such that the fluorinated hydrocarbon may condense at the inlet gas temperature, e.g. about 30° C.) provides for a higher potential for removing the exothermic heat of polymerization, therefore, providing an increase in polymer production in a given sized commercial gas phase reactor.

Utilizing the fluorinated hydrocarbons in the process of the invention provides for one or more of a substantial improvement in process operability, a significant reduction in fouling, improved catalyst performance, better polymer particle morphology with no adverse effect on the physical polymer properties, and/or the capability to produce a broader range of polymers.

In a preferred embodiment any of the polymerization process described herein are a continuous process. By continuous is meant a system that operates (or is intended to operate) without interruption or cessation. For example a continuous process to produce a polymer would be one in which the reactants are continuously introduced into one or more reactors and polymer product is continually withdrawn.

In a preferred embodiment, the invention provides for a gas phase process for polymerizing one or more hydrocarbon monomer(s) in the presence of a catalyst system and a condensable fluid, preferably a fluorinated hydrocarbon, wherein the process is operated in a condensed mode.

Alternately, the invention provides for a gas phase process for polymerizing one or more hydrocarbon monomer(s) in the presence of a conventional-type transition metal catalyst or catalyst system and a condensable fluid, preferably a fluorinated hydrocarbon, wherein, the conventional-type transition metal catalyst or catalyst system comprises a transition metal, wherein the molar ratio of the condensable fluid, preferably the fluorinated hydrocarbon, to the transition metal is greater than 500:1, preferably the molar ratio is in the range of from 900:1 to 10,000:1, preferably. 1500:1 to 20,000:1.

Alternately, the invention is directed to a gas phase process for polymerizing one or more hydrocarbon olefin(s), preferably at least one of which is ethylene or propylene, in the presence of a polymerization catalyst, in a fluidized bed reactor, the process operating in a condensed mode in which a liquid and a gas are introduced to the fluidized bed reactor having a fluidizing medium, wherein the level of condensable fluid, preferably a fluorinated hydrocarbon, is greater than 1 weight percent, preferably greater than 2 weight percent, more preferably greater than 10 weight percent, even more preferably greater than 15 weight percent, still even more preferably greater than 25 weight percent, and most preferably greater than 30 weight percent up to 60 weight percent or more, preferably 35 weight percent or more, based on the total weight of the liquid and gas entering the reactor.

In another embodiment, the polymerization catalyst comprises a metal, and the molar ratio of the condensable fluid, preferably the fluorinated hydrocarbon, to the metal is greater than 500:1, preferably in the range of from 900:1 to 10,000:1, preferably 1500:1 to 20,000:1.

In another embodiment, the process is further operated wherein the level of condensable liquid is greater than 1 weight percent, preferably greater than 2 weight percent, more preferably greater than 10 weight percent, even more preferably greater than 15 weight percent, still even more preferably greater than 25 weight percent, and most preferably greater than 30 weight percent up to 60 weight percent or more, preferably 35 weight percent or more, based on the total weight of the liquid and gas entering the reactor. In a further preferred embodiment, the conventional-type transition metal catalyst or catalyst system comprises a transition metal, wherein the molar ratio of the condensable fluid, preferably the fluorinated hydrocarbon, to the transition metal is greater than 500:1, preferably the molar ratio is greater than 900:1, and most preferably the molar ratio is greater than 1000:1.

In an embodiment, the invention is directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst or catalyst system and a condensable fluid, preferably a fluorinated hydrocarbon, into the reactor; (c) withdrawing the recycle stream from the reactor; (d) cooling the recycle stream to form a gas phase and a liquid phase; (e) reintroducing the gas phase and the liquid phase, separately, and/or in combination, into the reactor; (f) introducing into the reactor additional monomer(s) to replace the monomer(s) polymerized; and (g) withdrawing a polymer product from the reactor. In a preferred embodiment, the condensable fluid, preferably a fluorinated hydrocarbon, is introduced in a concentration greater than 0.5 mole percent, preferably greater than 1 mole percent, more preferably greater than 2 mole percent, still more preferably greater than 3 mole percent, even more preferably greater than 4 mole percent, still even more preferably greater than 5 mole percent, still even more preferably greater than 7 mole percent, still even more preferably greater than 10 mole percent, still even more preferably greater than 15 mole percent, still even more preferably greater than 20 mole percent, and most preferably greater than 25 mole percent, based on the total moles of gas in the reactor.

In any of the above processes of the invention, a preferred catalyst system or polymerization catalyst is a conventional-type transition metal catalyst such as a Ziegler-Natta-type catalyst and a Phillips-type catalyst, or a bulky ligand metallocene-type catalyst.

Catalyst Components and Catalyst Systems

All polymerization catalysts including conventional-type transition metal catalysts are suitable for use in the polymerization process of the invention. The following is a non-limiting discussion of the various polymerization catalysts useful in the process of the invention. All numbers and references to the Periodic Table of Elements are based on the new notation as set out in Chemical and Engineering News, 63(5), 27 (1985).

In the description herein the transition metal compound may be described as a catalyst precursor, a transition metal catalyst, a polymerization catalyst, or a catalyst compound, and these terms are used interchangeably. The term activator is used interchangeably with the term co-catalyst. A catalyst system is the combination of a catalyst compound and an activator.

Conventional-Type Transition Metal Catalysts

Conventional-type transition metal catalysts are those traditional Ziegler-Natta-type catalysts and Phillips-type chromium catalysts well known in the art. Examples of conventional-type transition metal catalysts are discussed in U.S. Pat. Nos. 4,115,639, 4,077,904 4,482,687, 4,564,605, 4,721, 763, 4,879,359 and 4,960,741, all of which are herein fully incorporated by reference. The conventional-type transition metal catalyst compounds that may be used in the present invention include transition metal compounds from Groups 3 to 10, preferably 4 to 6 of the Periodic Table of Elements.

These conventional-type transition metal catalysts may be represented by the formula:

$$MR_x \quad \text{(I)}$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred. British Patent Application 2,105,355, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu is butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$-OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional-type transition metal catalyst compounds and catalyst systems suitable for use in the present invention are disclosed in U.S. Pat. Nos. 4,124,532, 4,302, 565, 4,302,566 and 5,763,723 and published EP-A2 0 416 815 A2 and EP-A1 0 420 436, which are all herein incorporated by reference.

The conventional-type transition metal catalysts of the invention may also have the general formula:

$$M'_tM''X_{2t}Y_uE \quad \text{(II)}$$

where M' is Mg, Mn and/or Ca; t is a number from 0.5 to 2; M'' is a transition metal such as Ti, V and/or Zr; X is a halogen, preferably Cl, Br or I; Y may be the same or different and is halogen, alone or in combination with oxygen, —$NR_2$, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5 \cdot 2CH_3COOC_2H_5$, $Mg_3Ti_2Cl_{12} \cdot 7CH_3COOC_2H_5$, $MgTiCl_5 \cdot 6C_2H_5OH$, $MgTiCl_5 \cdot 100CH_3OH$, $MgTiCl_5$.tetrahydrofuran, $MgTi_2Cl_{12} \cdot 7C_6H_5CN$, $Mg_3Ti_2Cl_{12} \cdot 6C_6H_5COOC_2H_5$, $MgTiCl_6 \cdot 2CH_3COOC_2H_5$, $MgTiCl_6 \cdot 6C_5H_5N$, $MnTiCl_5 \cdot 4C_2H_5$ OH, $MgTiCl_5(OCH_3) \cdot 2CH_3COOC_2H_5$, $MgTiCl_5N(C_6H_5)_2 \cdot 3CH_3COOC_2H$, $MgTiBr_2Cl_4 \cdot 2(C_2H_5)_2$ O, $Mg_3V_2Cl_{12} \cdot 7CH_3$—$COOC_2H_5$, $MgZrCl_6 \cdot 4$ tetrahydrofuran. Other catalysts may include cationic catalysts such as $AlCl_3$, and other cobalt and iron catalysts well known in the art.

Typically, these conventional-type transition metal catalyst compounds (excluding some conventional-type chromium catalyst compounds) are activated with one or more of the conventional-type cocatalysts described below.

Conventional-Type Cocatalysts

Conventional-type cocatalyst compounds for the above conventional-type transition metal catalyst compounds may be represented by the formula:

$$M^3M^4_vX^2_cR^3_{b-c} \quad \text{(III)}$$

wherein $M^3$ is a metal from Group 1, 2, 12 and 13 of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1.

Other conventional-type organometallic cocatalyst compounds for the above conventional-type transition metal catalysts have the formula:

$$M^3R^3_k \quad \text{(IV)}$$

where $M^3$ is a Group 1, 2, 12 or 13 metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Groups 1, 2, 12 and 13 useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art, and a more complete discussion of these compounds may be found in U.S. Pat. Nos. 3,221,002 and 5,093,415, which are herein fully incorporated by reference.

For purposes of this patent specification and appended claims conventional-type transition metal catalyst compounds exclude those bulky ligand metallocene-type catalyst compounds discussed below. For purposes of this patent specification and the appended claims the term "cocatalyst" refers to conventional-type cocatalysts or conventional-type organometallic cocatalyst compounds.

In some embodiment, however, it is preferred that the catalyst system not comprise titanium tetrachloride, particularly not the combination of $TiCl_4$ and aluminum alkyl (such as triethylaluminum), particularly when the FC is a perfluorocarbon. In situations where the catalyst is titanium tetrachloride, particularly the combination of $TiCl_4$ and aluminum alkyl (such as triethylaluminum) the FC is preferably a hydrofluorocarbon. In another embodiment, the catalyst is not a free radical initiator, such as a peroxide.

Bulky Ligand Metallocene-Type Catalyst Compounds

Generally, polymerization catalysts useful in the invention include one or more bulky ligand metallocene compounds (also referred to herein as metallocenes). Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

Exemplary of these bulky ligand metallocene-type catalyst compounds and catalyst systems are described in for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520-732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 are all herein fully incorporated by reference for purposes of describing typical bulky ligand metallocene-type catalyst compounds and catalyst systems.

In one embodiment, the polymerization catalyst useful in the process of the invention includes one or more bulky ligand metallocene catalyst compounds represented by the formula:

$$L^A L^B MQ_n \qquad (V)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of t-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula V only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula V above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the polymerization catalysts useful in the process of the invention may include one or more bulky ligand metallocene catalyst compounds where $L^A$ and $L^B$ of Formula V are bridged to each other by at least one bridging group, A, as represented by:

$$L^A A L^B M Q_n \qquad (VI)$$

wherein $L^A$, $L^B$, M, Q and n are as defined above. These compounds of Formula VI are known as bridged, bulky ligand metallocene catalyst compounds. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula VI have two or more bridging groups A (EP-B1-0 664 301, which is incorporated herein by reference).

In another embodiment, the bulky ligand metallocene catalyst compounds are those where the R substituents on the bulky ligands $L^A$ and $L^B$ of Formulas V and VI are substituted with the same or different number of substituents on each of the bulky ligands. In another embodiment, the bulky ligands $L^A$ and $L^B$ of Formulas V and VI are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In another embodiment, the polymerization catalyst useful in the process of the invention includes one or more bulky ligand metallocene catalyst compounds represented by Formula VII:

$$L^C A J M Q_n \qquad (VII)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0, 1 or 2. In Formula VII above, $L^C$, A and J form a fused ring system.

In Formula VII, J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. In a preferred embodiment, when the catalyst system comprises compounds represented by Formula VII, the fluorocarbon preferably is a hydrofluorocarbon. Preferably, when the catalyst system comprises compounds represented by Formula VII, the fluorocarbon is not a perfluorocarbon.

In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in PCT Publication Nos. WO 96/33202, WO 96/34021, WO 97/17379 and WO 98/22486 and EP-A1-0 874 005 and U.S. Pat. Nos. 5,233,049, 5,539,124, 5,554,775, 5,637,660, 5,744,417, 5,756,611 and 5,856,258 all of which are herein incorporated by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the polymerization catalysts useful in the process of the invention includes one or more bulky ligand metallocene catalyst compounds represented by Formula VIII:

$$L^D MQ_2(YZ)X_n \quad (VIII)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; or Q is a univalent anionic ligand also bonded to M; X is a univalent anionic group when n is 2 or X is a divalent anionic group when n is 1; n is 1 or 2.

In Formula VIII, L and M are as defined above for Formula V. Q is as defined above for Formula V, preferably Q is selected from the group consisting of —O—, —NR—, —CR2- and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Still other useful polymerization catalysts include those multinuclear metallocene catalysts as described in PCT Publication No. WO 99/20665 and U.S. Pat. No. 6,010,794, and transition metal metaaracyle structures described in EP-A2-0 969 101, which are herein incorporated herein by reference. Other metallocene catalysts include those described in EP-A1-0 950 667, double cross-linked metallocene catalysts (EP-A1-0 970 074), tethered metallocenes (EP-A2-0 970 963) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference), chiral, achiral, and mixtures thereof.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT Publications Nos. WO 96/33202, WO 99/01481 and WO 98/42664, and U.S. Pat. No. 5,637,660, which are fully incorporated herein by reference.

In one embodiment, these catalyst compounds are represented by the formula:

$$((Z)XA_t(YJ))_q MQ_n \quad (IX)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional.

In another embodiment, where X is nitrogen or phosphorous then Z is present. In an embodiment, Z is preferably an aryl group, more preferably a substituted aryl group.

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

It is within the scope of this invention, in one embodiment, the polymerization catalysts useful in the process of the invention include complexes of $Ni^{2+}$ and $Pd^{2+}$ described in the articles Johnson, et al., "New Pd(II)— and Ni(II)-Based Catalysts for Polymerization of Ethylene and a-Olefins", *J.*

*Am. Chem. Soc.* 1995, 117, 6414-6415 and Johnson, et al., "Copolymerization of Ethylene and Propylene with Functionalized Vinyl Monomers by Palladium(II) Catalysts", *J. Am. Chem. Soc.*, 1996, 118, 267-268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst compounds useful herein are those diimine based ligands for Group 8 to 10 metal compounds disclosed in PCT publications WO 96/23010 and WO 97/48735 and Gibson, et. al., Chem. Comm., pp. 849-850 (1998), all of which are herein incorporated by reference.

Other bulky ligand metallocene-type catalysts useful herein are those Group 5 and 6 metal imido complexes described in EP-A2-0 816 384 and U.S. Pat. No. 5,851,945, which is incorporated herein by reference. In addition, bulky ligand metallocene-type catalysts useful herein include bridged bis(arylamido) Group 4 compounds described by D. H. McConville, et al., in Organometallics 1195, 14, 5478-5480, which is herein incorporated by reference. Other bulky ligand metallocene-type catalysts useful herein are described as bis(hydroxy aromatic nitrogen ligands) in U.S. Pat. No. 5,852,146, which is incorporated herein by reference. Other metallocene-type catalysts containing one or more Group 15 atoms useful herein include those described in WO 98/46651, which is herein incorporated herein by reference. Still another metallocene-type bulky ligand metallocene-type catalysts useful herein include those multinuclear bulky ligand metallocene-type catalysts as described in WO 99/20665, which is incorporated herein by reference. In addition, useful Group 6 bulky ligand metallocene catalyst systems are described in U.S. Pat. No. 5,942,462, which is incorporated herein by reference.

It is contemplated in some embodiments, that the bulky ligands of the metallocene-type catalyst compounds of the invention described above may be asymmetrically substituted in terms of additional substituents or types of substituents, and/or unbalanced in terms of the number of additional substituents on the bulky ligands or the bulky ligands themselves are different.

Mixed Catalysts

It is also within the scope of this invention that the above described bulky ligand metallocene-type catalyst compounds can be combined with one or more of the conventional-type transition metal catalysts compounds with one or more cocatalysts or activators or activation methods described above. For example, see U.S. Pat. Nos. 4,937,299, 4,935,474, 5,281,679, 5,359,015, 5,470,811, and 5,719,241, all of which are fully incorporated herein by reference.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated herein by reference.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090, all of which are herein incorporated by reference.

Activator and Activation Methods

The above described polymerization catalysts, particularly bulky ligand metallocene-type catalyst, are typically activated in various ways to yield polymerization catalysts having a vacant coordination site that will coordinate, insert, and polymerize olefin(s).

For the purposes of this invention, the term "activator" is defined to be any compound which can activate any one of the polymerization catalyst compounds described herein by converting the neutral polymerization catalyst compound to a catalytically active catalyst cation compound. Non-limiting activators, for example, include alumoxanes, aluminum alkyls, ionizing activators, which may be neutral or ionic, and conventional-type cocatalysts.

Alumoxanes

In one embodiment, alumoxane activators are utilized as an activator with the polymerization catalysts useful in the process of the invention. Alumoxanes are generally oligomeric compounds containing —Al(R)—O— subunits, where R is an alkyl group. Non-limiting examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. Another alumoxane is a modified methyl alumoxane (MMAO) cocatalyst type 3A (commercially available from Akzo Chemicals, Inc. under the trade name Modified Methylalumoxane type 3A; see U.S. Pat. No. 5,041,584). Aluminum alkyl or organoaluminum compounds which may be utilized as activators include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri(n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Non-limiting examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds for the polymerization catalysts described above may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+ \cdot (A^{d-}) \quad (X)$$

wherein: L is a neutral Lewis base; H is hydrogen; $(L-H)^+$ is a Bronsted acid; $A^{d-}$ is a non-coordinating anion having the charge $d-$; and d is an integer from 1 to 3. The cation component, $(L-H)_d^+$ may include Bronsted acids such as protons or protonated Lewis bases or reducible catalysts capable of protonating or abstracting a moiety, such as an alkyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ includes those having the formula $[M^{k+}Q_n]^{d-}$ wherein k is an integer from 1 to 3; n is an integer from 2-6; $n-k=d$; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic stoichiometric activator $(L-H)_d^+ \cdot (A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Additional Activators

Other activators include those described in PCT Publication No. WO 98/07515 such as tris(2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT Publications Nos. WO 94/07928 and WO 95/14044 and U.S. Pat. Nos. 5,153,157 and 5,453,410, all of which are herein fully incorporated by reference.

Other suitable activators are disclosed in PCT Publication No. WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate).4THF as an activator for a bulky ligand metallocene catalyst compound. PCT Publication No. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins.

Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis (tris(pentafluorophenyl)borane) benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d(A^{d-})_e \quad (XII)$$

wherein: $OX^{e+}$ is a cationic oxidizing agent having a charge of $e+$; e is an integer from 1 to 3; and $A^-$, and d are as previously defined above. Non-limiting examples of cationic oxidizing agents include: ferroceniurn, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It within the scope of this invention that any of the polymerization catalysts described above can be combined one or more activators or activation methods described above. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound.

Supported Activators

Many supported activators are useful in combination with one or more of the polymerization catalysts, especially the bulky ligand metallocene-type catalysts described above. A supported activator is where any one or more of the activators described above is supported on any one or more of the support materials described below. Non-limiting supported activators and methods for making them are described in various patents and publications which include: U.S. Pat. Nos. 4,871,705, 4,912,075, 4,935,397, 4,937,217, 4,937,301, 5,008,228, 5,015,749, 5,026,797, 5,057,475, 5,086,025, 5,147,949, 5,212,232, 5,229,478, 5,288,677, 5,332,706, 5,420,220, 5,427,991, 5,446,001, 5,468,702, 5,473,028, 5,534,474, 5,602,067, 5,602,217, 5,643,847, 5,728,855, 5,731,451, 5,739,368, 5,756,416, 5,777,143, 5,831,109, 5,856,255, 5,902,766, 5,910,463, 5,968,864 and 6,028,151 6,147,173; PCT Publications Nos. WO 94/26793, WO 96/16092, WO 98/02246 and WO 99/03580; and European Publication Nos. EP-B1-0 662 979, EP 0 747 430 A1, EP 0 969 019 A1, EP-B2-0 170 059, EP-A1-0 819 706 and EP-A1-0 953 581, which are all herein fully incorporated herein by reference.

Method for Supporting

The above described bulky ligand metallocene-type catalyst compounds and catalyst systems and conventional-type transition metal catalyst compounds and catalyst systems, may be combined with one or more support materials or carriers using one of the support methods well known in the art or as described below. In the preferred embodiment, the polymerization catalyst is in a supported form. For example, in a preferred embodiment, a bulky ligand metallocene-type catalyst compound or catalyst system is in a supported form, for example deposited on, contacted with, or incorporated within, adsorbed or absorbed in a support or carrier.

The terms "support" or "carrier" are used interchangeably and are any porous or non-porous support material, preferably a porous support material, for example, talc, inorganic oxides and inorganic chlorides. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports includes silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

It is preferred that the carrier, preferably an inorganic oxide, has a surface area in the range of from about 10 to about 700 $m^2/g$, pore volume in the range of from about 0.1 to about 4.0 cc/g and average particle size in the range of from about 10 to about 500 μm. More preferably, the surface area of the carrier is in the range of from about 50 to about 500 $m^2/g$, pore volume is of from about 0.5 to about 3.5 cc/g and average particle size of from about 20 to about 200 μm. Most preferably the surface area of the carrier is in the range of from about 100 to about 400 $m^2/g$, pore volume from about 0.8 to about 3.0 cc/g and average particle size is from about 20 to about 100 μm. The average pore size of a carrier of the invention is typically in the range of from about 10 Å to 1000 Å, preferably 50 Å to about 500 Å, and most preferably 75 Å to about 350 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,648,310, 5,665,665, 5,698,487, 5,714,424, 5,723,400, 5,723,402, 5,731,261, 5,743,202, 5,759,940, 5,767,032, 5,688,880, 5,770,755 and 5,770,664, and U.S. Application Serial Nos. 271,598 filed Jul. 7, 1994 and 788,736 filed Jan. 23, 1997 and PCT publications WO 95/32995, WO 95/14044, WO 96/06187, WO96/11960 and WO96/00243, which are herein fully incorporated by reference.

Examples of supporting the conventional-type catalyst systems of the invention are described in U.S. Pat. Nos. 4,894, 424, 4,376,062, 4,395,359, 4,379,759, 4,405,495 4,540758 and 5,096,869, all of which are herein incorporated by reference.

In one preferred embodiment, the support materials are treated chemically, for example with a fluoride compound as described in PCT Publication No. WO 00/12565, which is herein incorporated by reference. Other supported activators are described in for example PCT Publication No. WO 00/13792 that refers to supported boron containing solid acid complex.

In one embodiment of the invention, olefin(s), preferably $C_2$ to $C_{30}$ olefin(s) or alpha-olefin(s), preferably ethylene or propylene or combinations thereof are prepolymerized in the presence of the bulky ligand metallocene-type catalyst system and/or a conventional-type transition metal catalysts prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,467,080, 4,748,221, 4,789,359, 4,921,825, 5,204,303, 5,283,278, 5,322,830, 5,705,578, 6,391,987, 6,531,553, and 6,610,799, European Publication EP-B-0279 863 and PCT Publication No. WO 97/44371, all of which are herein fully incorporated by reference. In a gas phase prepolymerization process it is preferred to use a fluorinated hydrocarbon as a diluent, alone or in combination with other liquids. A prepolymerized catalyst system for purposes of this patent specification and appended claim is a supported catalyst system.

In one embodiment the polymerization catalyst is used in an unsupported form, preferably in a liquid form such as described in U.S. Pat. Nos. 5,317,036 and 5,693,727, PCT publication WO 97/46599 and European publication EP-A-0 593 083, all of which are herein incorporated by reference.

Polymerization Process

The polymerization catalysts and catalyst systems described above are suitable for use in any gas phase polymerization process, including fluidized bed or stirred bed processes. Particularly preferred is a gas phase polymerization process in which one or more condensable fluids as described below is utilized.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. In a preferred process, a condensable fluid as described below, is introduced to the process for purposes of increasing the cooling capacity of the recycle stream. The purposeful introduction of a condensable fluid into a gas phase process is a condensed mode process. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352, 749, 5,405,922, 5,436,304, 5,453,471, 5,462,999, 5,616,661 and 5,668,228 all of which are fully incorporated herein by reference.)

Condensable Fluids

Condensable fluids useful herein include hydrocarbons, and are preferably fluorinated hydrocarbons including perfluorinated hydrocarbons, preferably having little to no solvent power regarding the reaction components such as the monomer and polymer products. In one embodiment, one or more fluorinated hydrocarbons or perfluorinated carbons are utilized in the process of the invention.

In an embodiment, the fluorinated hydrocarbons are defined to be compounds consisting essentially of at least one carbon atom and at least one fluorine atom, and optionally at least one hydrogen atom. A perfluorinated carbon is a compound consisting essentially of carbon atom(s) and fluorine atom(s), and includes for example linear branched or cyclic, $C_1$ to $C_{40}$ perfluoroalkanes, preferably $C_{11}$ to $C_{40}$ perfluoroalkanes. In one embodiment, the condensable fluids, preferably the perfluorinated carbons exclude perfluorinated $C_{4-10}$ alkanes.

In one embodiment, the fluorinated hydrocarbons are represented by the formula:

$$C_xH_yF_z \qquad (XII)$$

wherein x is an integer from 1 to 40, preferably from 1 to 30, more preferably from 1 to 20, even more preferably from 1 to 10, and still even more preferably from 1 to 6, alternatively x is an integer from 2 to 20, preferably from 3 to 10, more preferably from 3 to 6, and most preferably from 1 to 3, and wherein y is greater than or equal 0 and z is an integer and at least one, more preferably, y and z are integers and at least one. In a preferred embodiment, z is 2 or more.

In one embodiment, a mixture of fluorinated hydrocarbons are used as the condensable fluids in the process of the invention, preferably a mixture of a perfluorinated carbon and a fluorinated hydrocarbon, and more preferably a mixture of fluorinated hydrocarbons. In yet another embodiment, the fluorinated hydrocarbon is balanced or unbalanced in the number of fluorine atoms in the fluorinated hydrocarbon compound.

Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl) propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl) propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred fluorinated hydrocarbons include difluoromethane, trifluoromethane, 1,1-difluoroethane, 1,1,1-trifluoroethane, fluoromethane, and 1,1,1,2-tetrafluoroethane. In addition to those fluorinated hydrocarbons described herein, those fluorinated hydrocarbons described in Raymond Will, et. al., CEH Marketing Report, Fluorocarbons, Pages 1-133, by the Chemical Economics Handbook-SRI International, April 2001, which is fully incorporated herein by reference, are included.

In another embodiment the fluorinated hydrocarbons are used in combination with one or more inert gases such as carbon dioxide, nitrogen, hydrogen, argon, neon, helium, krypton, zenon, and the like. In the preferred embodiment, the inert gas is nitrogen.

In another preferred embodiment, the fluorinated hydrocarbon used in the process of the invention are selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorinated hydrocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane and/or HFC-365mfc, all of these are commercially available fluorinated hydrocarbons.

In another embodiment, the fluorocarbon is not a perfluorinated $C_4$ to $C_{10}$ alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon, monomers and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than S5 volume %, preferably greater than 60 volume %, preferably greater than 65 volume %.

In yet another embodiment, the fluorinated hydrocarbons of the invention have a molecular weight (MW) greater than 90 a.m.u., preferably greater than 95 a.m.u, and more preferably greater than 100 a.m.u. In another embodiment, the fluorinated hydrocarbons of the invention have a MW greater than 120 a.m.u, preferably greater than 125 a.m.u, even more preferably greater than 130 a.m.u, and most preferably greater than 140 a.m.u. In still another embodiment, the fluorinated hydrocarbons of the invention have a MW greater than 125 a.m.u, preferably greater than 130 a.m.u, even more, preferably greater than 135 a.m.u, and most preferably greater than 150 a.m.u. In another embodiment, the fluorinated hydrocarbons of the invention have a MW greater than 140 a.m.u, preferably greater than 150 a.m.u, more preferably greater than 180 a.m.u, even more preferably greater than 200 a.m.u, and most preferably greater than 225 a.m.u. In an embodiment, the fluorinated hydrocarbons of the invention have a MW in the range of from 90 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorinated hydrocarbons of the invention have normal boiling points in the range of from about −50° C. up to the polymerization temperature, preferably a polymerization temperature of about 85° C., preferably the normal boiling points of the fluorinated hydrocarbons are in the range of from −40° C. to about 70° C., more preferably from about −30° C. to about 60° C., and most preferably from about −30° C. to about 55° C. In an embodiment, the fluorinated hydrocarbons of the invention have normal boiling points greater than −30° C., preferably greater than −30° C. to less than −10° C. In a further embodiment, the fluorinated hydrocarbons of the invention have normal boiling points greater than −5° C., preferably greater than −5° C. to less than −20° C. In one embodiment, the fluorinated hydrocarbons of the invention have normal boiling points greater than 30° C., preferably greater than 30° C. to about 60° C.

In another embodiment, the fluorinated hydrocarbons of the invention have a liquid density at 20° C. (g/cc) greater than 1 g/cc, preferably greater than 1.10, and most preferably greater than 1.20 g/cc. In one embodiment, the fluorinated hydrocarbons of the invention have a liquid density at 20° C. (g/cc) greater than 1.20 g/cc, preferably greater than 1.25, and most preferably greater than 1.30 g/cc. In an embodiment, the fluorinated hydrocarbons of the invention have a liquid density at 20° C. (g/cc) greater than 1.30 g/cc, preferably greater than 1.40, and most preferably greater than 1.50 g/cc.

In one embodiment, the fluorinated hydrocarbons of the invention have a Heat of Vaporization (ΔH Vaporization) as measured by standard calorimetry techniques in the range between 100 kJ/kg to less than 300 kJ/kg, preferably in the range of from 110 kJ/kg to less than 300 kJ/kg, and most preferably in the range of from 120 kJ/kg to less than 300 kJ/kg.

In another preferred embodiment, the fluorinated hydrocarbons of the invention have any combination of two or more of the aforementioned MW, normal boiling point, ΔH Vaporization, and liquid density values and ranges. In a preferred embodiment, the fluorinated hydrocarbons useful in the process of the invention have a MW greater than 90 a.m.u, preferably greater than 100 a.m.u, and a liquid density greater than 1.00 g/cc, preferably greater than. 1.20 g/cc. In yet another preferred embodiment, the fluorinated hydrocarbons useful in the process of the invention have a liquid density greater than 1.10 g/cc, preferably greater than 1.20 g/cc, and a normal boiling point greater than −50° C., preferably greater than −30° C. up to the polymerization temperature of the process, which is as high as 100° C., preferably less than 85° C., and more preferably less than 75° C., and most preferably less than 60° C. In one embodiment, the fluorinated hydrocarbons useful in the process of the invention have a MW greater than 90 a.m.u, preferably greater than 100 a.m.u, and a ΔH Vaporization in the range of from 100 kj/kg to less than 300 kj/kg, and optionally a liquid density greater than 1.00 g/cc, preferably greater than 1.20 g/cc. In yet another embodiment, the fluorinated hydrocarbons useful in the process of the invention have a liquid density greater than 1.10 g/cc, preferably greater than 1.20 g/cc, and a normal boiling point greater than −50° C., preferably greater than −30° C. up to the polymerization temperature of the process, which is as high as 100° C., preferably less than 85° C., and more preferably less than 75° C., and most preferably less than 60° C., and optionally a ΔH Vaporization in the range of from 120 kj/kg to less than 250 kj/kg.

In yet another embodiment, one or more fluorinated hydrocarbon(s), alone or in combination, with one or more other typical inert condensable agent(s) or condensing agent(s) are used in the process of the invention. Examples of suitable, preferably inert, condensable agents are readily volatile liquid hydrocarbons, which include, for example, saturated hydrocarbons containing from 3 to 8 carbon atoms, such as propane, n-butane, isobutane (MW of 58.12 a.m.u, a liquid density of 0.55 g/cc, and normal boiling point as above described of −11.75), n-pentane, isopentane (MW of 72.15 a.m.u, a liquid density of 0.62 g/cc, and normal boiling point of 27.85), neopentane, n-hexane, isohexane, and other saturated $C_6$ to $C_8$ hydrocarbons.

In another embodiment, the fluorinated hydrocarbon(s) is selected based upon its solubility or lack thereof in a particular polymer being produced. Preferred fluorinated hydrocarbon(s) have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the fluorinated hydrocarbon(s), exposed for 90 seconds to evaporate excess condensable fluid from the surface of the film, and weighed. The mass uptake is defined as the percentage increase in the film weight after soaking. The fluorinated hydrocarbon or fluorinated hydrocarbon mixture is selected so that the polymer has a mass uptake of less than 4 wt %, preferably less than 3 wt %, more preferably less than 2 wt %, even more preferably less than 1 wt %, and most preferably less than 0.5 wt %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an FC's does not influence the polymerization reactions, in fact, it may do so to some extent, such as affecting activity rates. However, it is meant to say that the FC's are not present as part of the catalyst system.)

In a preferred embodiment, the fluorinated hydrocarbon(s) or mixtures thereof, are selected such that the polymer melting temperature Tm is reduced (or depressed) by not more than 15° C. by the presence of the condensable fluid. The depression of the polymer melting temperature ΔTm is determined by first measuring the melting temperature of a pure polymer (Tm) by differential scanning calorimetry (DSC), and then comparing this to a similar measurement on a sample of the same polymer that has been soaked with the condensable fluid. In general, the melting temperature of the soaked polymer will be lower than or equal to that of the dry polymer. The difference in these measurements is taken as the melting point depression ΔTm. It is well known to those in the art that higher concentrations of dissolved materials in the polymer cause larger depressions in the polymer melting temperature (i.e. higher values of ΔTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the condensable fluid to be evaluated). As described in the reference above, it is important to ensure that the second part of the test, conducted in the presence of the liquid, is done in a sealed container so that the liquid is not flashed during the test, which could introduce experimental error.

In one embodiment, the ΔTm of polymers in the presence of the condensable fluid, especially the polymers made in the presence of fluorinated hydrocarbon, is less than 12° C., preferably less than 10° C., preferably less than 8° C., more preferably less than 6° C., and most preferably less than 4° C. below the pure polymer Tm, as defined above. In another embodiment, the measured ΔTm is less than 5° C., preferably less than 4° C., more preferably less than 3° C., even more preferably less than 2° C., and most preferably less than 1° C. than the pure polymer Tm as measured above.

Monomers

Polymers produced according to this invention are olefin polymers or "polyolefins". By olefin polymers is meant that at least 75 mole % of the polymer is made of hydrocarbon monomers, preferably at least 80 mole %, preferably at least 85 mole %, preferably at least 90 mole %, preferably at least 95 mole %, preferably at least 99 mole %. In a particularly preferred embodiment, the polymers are 100 mole % hydrocarbon monomer. Hydrocarbon monomers are monomers made up of only carbon and hydrogen. In another embodiment of the invention up to 25 mol % of the polyolefin is derived from heteroatom containing monomers. Heteroatom containing monomers are hydrocarbon monomers where one or more hydrogen atoms have been replaced by a heteroatom. In a preferred embodiment, the heteroatom is selected from the group consisting of chlorine, bromine, oxygen, nitrogen, silicon and sulfur, preferably the heteroatom is selected from the group consisting of oxygen, nitrogen, silicon and sulfur, preferably the heteroatom is selected from the group consisting of oxygen and nitrogen, preferably oxygen. In a preferred embodiment, the heteroatom is not fluorine. In another embodiment of the invention, the monomers to be polymerized are not fluoromonomers. Fluoromonomers are defined to be hydrocarbon monomers where at least one hydrogen atom has been replaced by a fluorine atom. In another embodiment of the invention, the monomers to be polymerized are not halomonomers. (By halomonomer is meant a hydrocarbon monomer where at least one hydrogen atom is replaced by a halogen.) In another embodiment of the invention, the monomers to be polymerized are not vinyl aromatic hydrocarbons. In another embodiment of the invention, the monomers to be polymerized are preferably aliphatic or alicyclic hydrocarbons. (as defined under "Hydrocarbon" in Hawley's Condensed Chemical Dictionary, 13th edition, R. J. Lewis ed., John Wiley and Sons, New York, 1997. In another embodiment of the invention, the monomers to be polymerized are preferably linear or branched alpha-olefins, preferably C2 to C40 linear or branched alpha-olefins, preferably C2 to C20 linear or branched alpha-olefins, preferably ethylene, propylene, butene, pentene, hexene, heptene, octene, nonene, decene, undecene, dodecene, or mixtures thereof, more preferably ethylene, propylene, butene hexene and octene.

In one embodiment, the process of this invention is directed toward a gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention include butadiene, norbornene, norbornadiene, isobutylene, vinylbenzocyclobutane, ethylidene norbornene, isoprene, dicyclopentadiene and cyclopentene.

In a preferred embodiment of the process of the invention, a copolymer of ethylene is produced, where the ethylene and a comonomer having at least one alpha-olefin having from 3 to 15 carbon atoms, preferably from 4 to 12 carbon atoms, and most preferably from 4 to 8 carbon atoms, are polymerized in a gas phase process.

In another embodiment of the process of the invention, ethylene or propylene is polymerized with at least two different comonomers, optionally one of which may be a diene, to form a terpolymer.

Condensed Mode Process

In a preferred gas phase process of the invention, the gas phase process is operated in a condensed mode, where a condensable fluid as described above, especially a fluorinated hydrocarbon, is introduced to the process to increase the cooling capacity of the recycle stream. In another embodiment the invention relates to a gas phase process for polymerizing one or more olefin(s), preferably at least one of which is ethylene or propylene, in a fluidized bed reactor, the process operating in a condensed mode in which a liquid and a gas are introduced to the fluidized bed reactor having a fluidizing medium or a stirred bed reactor having a medium, wherein the level of condensable fluid, preferably a fluorinated hydrocarbon, is greater than 5 weight percent, preferably greater than 10 weight percent, or greater than 15 weight percent or greater than 20 weight percent, more preferably greater than 25 weight percent, even more preferably greater than 30 weight percent, still even more preferably greater than 35 weight percent, and most preferably greater than 30 weight percent up to 60 weight percent, preferably 50 weight percent, based on the total weight of the liquid and gas entering the reactor. For further details of a condensed mode process see U.S. Pat. Nos. 5,342,749 and 5,436,304 both of which are herein fully incorporated herein by reference.

To achieve higher cooling capacities, and enable higher reactor production rates it is desirable to raise the dew point temperature of the recycle stream to permit a higher level of condensing at the inlet to the gas phase reactor. The dew point temperature of the recycle stream is typically raised by increasing the operating pressure of the reaction/recycle system and/or increasing the percentage of condensable fluids and decreasing the percentage of non-condensable gases in the recycle stream. The advantages of a process operating in condensed mode generally increase directly with the nearness of the dew point temperature of the recycle steam to the reaction temperature within the interior of the fluidized bed. The advantages of the process may increase directly with the percentage of liquid in the recycle stream returned to the reactor. For a given inlet gas temperature, higher dew point temperatures cause an increased level of condensing (higher weight percent condensed). The higher condensing levels provide additional cooling and hence higher production rate capability in the reactor.

In one preferred embodiment of the invention, the invention is directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst and a condensable fluid, preferably a fluorinated hydrocarbon, into the reactor; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In a most preferred embodiment, the condensable fluid is introduced in amount greater than 10 weight percent or greater than 15 weight percent or greater than 20 weight percent, preferably greater than 25 weight percent, more preferably greater than 30 weight percent, and most preferably greater than 40 weight percent based on the total weight of fluidizing medium being reintroduced into the reactor.

In another preferred embodiment of the invention, the invention is directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst and a condensable fluid, preferably a fluorinated hydrocarbon, into the reactor; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In this embodiment, the condensable fluid is introduced in a concentration greater than 0.5 mole percent, preferably greater than 1 mole percent, preferably greater than 2 mole percent, more preferably greater than 3 mole percent, even more preferably greater than 4 mole percent, still even more preferably greater than 5 mole percent, and most preferably greater than 7 mole percent, based on the total moles of gas in the reactor.

It is believed without being bound to any particular theory, that the advantages of a fluorinated hydrocarbon (in place of or in combination with a typical inert hydrocarbon condensable fluid) arise from the relative lack of solubility of the fluorinated hydrocarbon in the resin product. Because the fluorinated hydrocarbons are less soluble in the polymers being produced, higher concentrations of may be used in the reactor without inducing stickiness in the resin. The higher condensable concentrations allow higher dew point temperatures in the reactor gas, correspondingly higher condensing levels at the reactor inlet, and higher production rates. Because the fluorinated hydrocarbons are relatively non-soluble for all polyolefin polymers, including low density polyethylene, they enable production of low density polyethylene at production rates unattainable in the past due to polymer stickiness problems with conventional hydrocarbons.

Other gas phase processes in which fluorinated hydrocarbons are useful include those described in U.S. Pat. Nos. 5,627,242, 5,665,818 and 5,677,375, and European publications EP-A-0 794 200, EP-A-0 802 202, EP-A2 0 891 990 and EP-B-634 421, all of which are herein fully incorporated by reference.

Reactor Conditions

The reactor pressure in any of the gas phase processes described in the above embodiments vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in any of the gas phase processes described in the above embodiments vary from about 30° C. to about 120° C. preferably from about 60° C. to about 115° C., more preferably in the range of from about 70° C. to 110° C., and most preferably in the range of from about 70° C. to about 100° C. In another embodiment, the polymerization temperature is above room temperature (23° C.), preferably above 30° C., preferably above 50° C., preferably above 70° C.

In a preferred embodiment, in any of the gas phase processes described in the above embodiments, the process is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr), and most preferably greater than 65,000 lbs/hr (29,000 Kg/hr) to greater than 100,000 lbs/hr (45,500 Kg/hr)

In a preferred embodiment of the process of invention in any of the embodiments described herein, the fluorinated hydrocarbon is used in an amount such that the molar ratio of the one or more fluorinated hydrocarbon(s) to the metal of one or more of the polymerization catalyst(s) or catalyst system(s), especially where the metal is from a Group 3 though 12 metal, preferably a Group 3 through 8 metal, and most preferably a Group 4 through 6 metal, is in the molar ratio of from 500:1 to 20,000:1, preferably from 500:1 to 10,000:1, preferably from 900:1 to 8000:1, even more preferably from 2000:1 to 5000:1, and most preferably from to 2000:1 to 3500:1. In another preferred embodiment of the process of invention in any of the embodiments described herein, the fluorinated hydrocarbon is used in an amount such that the molar ratio of the one or more fluorinated hydrocarbon(s) to the metal of one or more of the polymerization catalyst(s) or catalyst system(s), especially where the metal is from a Group 3 though 12 metal, preferably a Group 3 through 8 metal, and most preferably a Group 4 through 6 metal, is in the molar ratio greater than 500:1, preferably greater than from 900:1, even more preferably greater than 1000:1, still even more preferably greater than 2000:1, still even more preferably greater than 3000:1, and most preferably greater than 10,000:1. In the above embodiments, the most preferable metals are the transition metals, preferably Group 4 through 6 transition metals including titanium, hafnium, zirconium, chromium and vanadium.

In another preferred embodiment of any of the embodiments of the process of invention herein, the amount of one or more condensable fluids, particularly one or more fluorinated hydrocarbon(s) is determined by the partial pressure of the one or more fluorinated hydrocarbon(s) being introduced to the process, particularly into the reactor. In this embodiment, the partial pressure of the one or more fluorinated hydrocarbon(s) is in the range of from 1 psia (6.9 kPa) to 500 psia (3448 kPa), preferably is in the range from about 2 psig (13.8 kPa) to about 250 psia (1724 kPa), more preferably is in the range from 2 psia (13.8 kPa) to 100 psia (690 kPa), still more preferably in the range from about 5 psia (34.5 kPa) to 90 psia (621 kPa), and most preferably in the range of from 5 psia (34.5 kPa) to about 80 psia (552 kPa).

In any of the embodiments described herein, the fluorinated hydrocarbon is present at 5 mole % or more, based upon the moles of fluorinated hydrocarbon, hydrocarbon solvent and monomers present in the reactor, alternately at 10 mole % or more, alternately at 15 mole % or more, alternately at 20 mole % or more, alternately at 25 mole % or more, alternately at 30 mole % or more, alternately at 35 mole % or more, alternately at 40 mole % or more, alternately at 45 mole % or more, alternately at 50 mole % or more, alternately at 55 mole % or more, alternately at 60 mole % or more, alternately at 65 mole % or more.

Polymer Product of the Invention

The polymers produced by the process of the invention are useful in making a wide variety of products and useful in many end-use applications. The polymers produced by the process of the invention include linear low density polyethylenes, elastomers, plastomers, high density polyethylenes, low density polyethylenes, polypropylene and polypropylene copolymers.

The polymers produced, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc.

In one embodiment, the polymers produced by the process of the invention typically have a molecular weight distribution, a weight average molecular weight to number average molecular weight ($M_w/M_n$) of greater than 1.5 to about 30, particularly greater than 2 to about 15, more preferably greater than 2 to about 10, even more preferably greater than about 2.2 to less than about 8, and most preferably from 2.5 to 8. The ratio of $M_w/M_n$ is measured by gel permeation chromatography techniques well known in the art.

In yet another embodiment, the ethylene-based polymers produced by the process of the invention typically have a narrow or broad composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. Typically when a bulky ligand metallocene-type polymerization catalyst is utilized in the process of the invention producing an ethylene copolymer, terpolymer and the like, the CDBI's are generally in the range of greater than 50% to 99%, preferably in the range of 55% to 85%, and more preferably 60% to 80%, even more preferably greater than 60%, still even more preferably greater than 65%. Typically when a conventional-type transition metal polymerization catalyst is utilized in the process of the invention producing an ethylene copolymer, terpolymer and the like, the CDBI's are generally less than 50%, more preferably less than 40%, and most preferably less than 30%. Also, whether a bulky ligand metallocene-type polymerization catalyst or a conventional-type transition metal polymerization catalyst is being used and the process is making an ethylene homopolymer, the CDBI is 100%.

Generally, the polymers produced by the process of the invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. Also, generally, the polymers of the invention in an embodiment have a melt index ratio ($I_{21}/I_2$) ($I_{21}$ is measured by ASTM-D-1238-F) of from 10 to less than 25, more preferably from about 15 to less than 25. Further, in another embodiment, the polymers have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In yet another embodiment, the polymers, particularly polymers produced in the process of the invention using a Ziegler-Natta-type polymerization catalyst, have a melt index ratio ($I_{21}/I_2$) ($I_{21}$ is measured by ASTM-D-1238-F) in the range of from 15 to 40, preferably in the range of from about 20 to about 35, more preferably in the range of from about 22 to about 30, and most preferably in the range of from 24 to 27.

In yet another embodiment, propylene based polymers are produced in the process of the invention. These polymers include atactic polypropylene, isotactic polypropylene, and syndiotactic polypropylene. Other propylene polymers include propylene random, block or impact copolymers.

In one embodiment, the invention is directed to a gas phase process for polymerizing one or more monomer(s) producing a polymer product in the presence of a catalyst system and a fluorinated hydrocarbon, wherein the catalyst system is a bulky ligand metallocene-type catalyst systems as previously defined, and the polymer product having a density in the range of from about 0.915 g/cc to about 0.950 g/cc, preferably in the range of from about 0.915 g/cc to 0.945 g/cc, and more preferably in the range of from about 0.915 g/cc to about 0.940 g/cc, and a polymer production rate greater than 40,000 kg/hour, preferably greater than 55,000 kg/hour and most preferably greater than 70,000 kg/hour. In a preferred embodiment, the gas phase process includes a fluidizing medium that is introduced to a reactor, and the process is operating in a condensed mode wherein the level of condensing or condensed liquid is greater than 15 weight percent, preferably greater than 32 weight percent, and most preferably greater than 50 weight percent based on the total weight of fluidizing medium being introduced into the reactor. In yet another embodiment, the partial pressure of the fluorinated hydrocarbon is in the range of from 30 psia (207 kPa) to about 100 psia (690 kPa), preferably in the range from about 35 psia (241 kPa) to 90 psia (621 kPa), and most preferably in the range of from 40 psia (276 kPa) to about 80 psia (552 kPa).

In one embodiment, the invention is directed to a gas phase process for polymerizing one or more monomer(s) producing a polymer product in the presence of a catalyst system and a fluorinated hydrocarbon, wherein the catalyst system is a bulky ligand metallocene-type catalyst systems as previously defined, and the polymer product having a density in the range of from about 0.87 g/cc to less than 0.915 g/cc, preferably in the range of from about 0.88 g/cc to 0.914 g/cc, and more preferably in the range of from about 0.900 g/cc to 0.913 g/cc, and a polymer production rate greater than 35,000 kg/hour, preferably greater than 50,000 kg/hour and most preferably greater than 65,000 kg/hour. In a preferred embodiment, the gas phase process includes a fluidizing medium that is introduced to a reactor, and the process is operating in a condensed mode wherein the level of condensing or condensed is greater than 15 weight percent, preferably greater than 32 weight percent, and most preferably greater than 50 weight percent based on the total weight of fluidizing medium being introduced into the reactor. In yet another embodiment, the partial pressure of the fluorinated hydrocarbon is in the range of from 10 psia (69 kPa) to about 100 psia (690 kPa), preferably in the range from about 15 psia (103 kPa) to 90 psia (621 kPa), and most preferably in the range of from 20 psia (138 kPa) to about 80 psia (552 kPa).

In another embodiment, the invention is directed to a gas phase process for polymerizing one or more monomer(s) producing a polymer product in the presence of a catalyst system and a fluorinated hydrocarbon, wherein the catalysts system is a conventional-type transition metal catalyst system, preferably a Ziegler-Natta-type catalyst system or Phillips type catalyst system, as previously defined, and the polymer product having a density in the range of from about 0.88 g/cc to about 0.940 g/cc, preferably in the range of from about 0.900 g/cc to 0.940 g/cc, and more preferably in the range of from about 0.910 g/cc to about 0.930 g/cc, and a polymer production rate greater than 40,000 kg/hour, preferably greater than 55,000 kg/hour and most preferably greater than 70,000 kg/hour. In a preferred embodiment, the gas phase process includes a fluidizing medium that is introduced to a reactor, and the process is operating in a condensed mode wherein the level of condensing or condensed is greater than 18 weight percent, preferably greater than 34 weight percent, and most preferably greater than 50 weight percent based on the total weight of fluidizing medium being introduced into the reactor. In yet another embodiment, the partial pressure of the fluorinated hydrocarbon is in the range of from 5 psia (35 kPa) to about 100 psia (690 kPa), preferably in the range from about 10 psia (69 kPa) to 90 psia (621 kPa), more preferably in the range of from 15 psia (103 kPa) to about 80 psia (552 kPa), and most preferably in the range of from 20 psia (138 kPa) to about 60 psia (414 kPa).

Polymers produced by the process of the invention are useful in such forming operations as film, sheet, and fiber extrusion and co-extrusion as well as blow molding, injection molding and rotary molding. Films include blown or cast films formed by coextrusion or by lamination, shrink film, cling film, stretch film, sealing films, oriented films. The films are useful in snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Melt index was determined according to ASTM D 1238 (2.16 kg, 230° C.)

Density is measured in accordance with ASTM-D-1238.

Comparative Examples 1, 2 and 3, and Examples 4, 5, and 6

The cocatalyst was triethylaluminum (TEAL). The TEAL was obtained as a 1 M solution in hexane from Aldrich Chemical Company and was used as received.

A small amount, 3.65 g, of anhydrous hexane was obtained from Aldrich Chemical Company, and was used to top off the catalyst in the catalyst charge tube.

The isopentane was obtained from Aldrich Chemical Company (2-methylbutane, anhydrous) and was used as received.

The 1-hexene comonomer was obtained from Alfa Aesar, and was purified prior to use by passing it through a column of activated aluminum oxide, obtained from Aldrich Chemical Company. Before use, the activated aluminum oxide was placed in a vacuum oven at 200° C., and vacuum was applied at least overnight.

The ethylene was passed through a series of purification columns on the way to the reactor. The columns were (sequentially): 3 A molecular sieves, Selexsorb CD alumina, Selexsorb COS alumina, and Oxyclear column. The 3A mole sieves were 8-12 mesh and were obtained from Aldrich Chemical Company. The Selexsorb CD alumina (7×14 mesh) and Selexsorb COS (7×14 mesh) were manufactured by Alcoa Chemical company. The Oxyclear column was obtained from Lab Clear, Oakland, Calif.

The salt used as a seedbed was obtained from Fisher Scientific. The salt was prepared by placing it into a cleaned reactor and then sealing the reactor. A nitrogen purge was started to the reactor and steam was applied to the reactor jacket. Typical jacket temperatures were 130° C. to 140° C., which produced an internal temperature of approximately 110° C. During the drying, the agitator was set between 200 to 250 RPMs. Drying of the salt bed was maintained for at least four hours. After the appropriate amount of heating and nitrogen purging, the salt seedbed was used for the experiment.

The HFC-245fa was obtained from Honeywell, commercially available under their trade name Enovate 3000. The HFC-236fa was obtained from DuPont, commercially available under their trade name SUVA 236fa. The R-134a was an automotive grade material. The HFC-245fa was passed through purification columns containing 3A mole sieves, 13× mole sieves, and Selexsorb CD alumina, and Oxyclear. The 13× mole sieves were 8 to 12 mesh and were obtained from Aldrich Chemical Company. The other packing materials were the same as those for the ethylene purification (described above). The R-134a and HFC-236fa were used as received without any purification.

Polymerization Process

The reactor used was a 2-liter Stainless Steel Autoclave, available from Autoclave Engineers (a division of Snap-Tite Corp. of Erie, Pa.). The reactor was outfitted with ports for injection of reagents and feed gas, and it had a double flight, helical impeller with a bottom auger (Autoclave Engineers) that provided the required mixing.

The catalyst used in the examples was a Ziegler-Natta type polymerization catalyst or catalyst system similar to that described in Example A below. The cocatalyst used was triethylaluminum (TEAL), and the comonomer was 1-hexene. All experiments were carried out at a reaction temperature of 85° C.

For each experiment, the reactor was purged with nitrogen in preparation for addition of a seedbed of salt (NaCl). The autoclave head was removed and a predetermined quantity of NaCl was charged to the reactor. The reactor was sealed up and purged with nitrogen at 110° C. or higher for 4 to 64 hours to remove any adsorbed moisture from the salt seedbed and the reactor internals. During the nitrogen purge period, the internal agitator was operated between 200 to 250 RPM. The reactor was then cooled to ambient temperature and 4 ml of 1 Molar TEAL (Triethylaluminum co-catalyst) solution in hexane was injected into the reactor through a syringe injection port on the autoclave head. In each experiment, 11 cc of hexene was then added as the comonomer. The isopentane, a condensable agent, (if used in the experiment) was added via a syringe. The reactor was then heated and maintained at 85° C. A predetermined quantity of catalyst suspended in a solution of hexane was pressured with nitrogen into the reactor from a catalyst charge tube. If a fluorinated hydrocarbon, a condensable fluid was used, it was added via a second charge tube in series behind the catalyst charge tube and nitrogen forced this material into the reactor along with the catalyst. Following the catalyst charge to the reactor, the total reactor pressure was measured and recorded (normally between 536 and 562 kPa). The reactor pressure was then increased to 2960 kPa with ethylene. As the reaction began, the reactants were consumed, the reactor total pressure was maintained with the addition of ethylene as needed. The reaction was quenched after a predetermined time (usually 60 minutes) by venting the reactor gas to a fume hood, and by cooling the remaining materials in the reactor to ambient temperature.

For each experiment, the agitator was set and maintained at 250 RPM. However, there was some variation in the time at which the agitator was switched on, either prior to the addition of the liquid hexene-1 and TEAL, or immediately after the addition of liquid hexene-1 and TEAL. These differences are noted in Table 1 as a "Yes" or "No" entry in the column labeled "Stirring During Liquid Addition" column.

When the reaction was completed, the polymer product and salt were poured from the autoclave and the polymer product was separated from the salt using a water wash. The polymer product was then removed from the water wash, vacuum filtered, and allowed to dry under ambient conditions. The polymer products were in the form of granular material.

Any salt and polymer that remained in the reactor following the pouring of product from the reactor was designated as foulant material. Most of the runs did not produce foulant material, but for those that did, the foulant was scrapped from the reactor walls and agitator, and then weighed and recorded in Table 1.

TABLE 1

| Run No. | Condensable Fluid or Condensing Agent Used | Amount of Condensable Fluid or Condensing Agent Added [g] | Seed Bed Wt. [g] | Catalyst Added [mg] | Reactor Pressure Following Catalyst Charge [kPa] | Reactor Pressure Following Ethylene Charge [kPa] | Stirring During Liquid Additions | Total Polymer Produced [g] | Weight of Polymer Fouled [g] | Productivity [g/g/hr] | Polymer Density [g/cc] |
|---|---|---|---|---|---|---|---|---|---|---|---|
| C Ex 1 | None | 0 | 400 | 129 | 562 | 2962 | No | 26.2 | 0.9 | 203 | 0.9426 |
| C Ex 2 | None | 0 | 100 | 131 | 549 | 2962 | Yes | 27.1 | 0.4 | 207 | 0.9430 |
| C Ex 3 | Isopentane | 3.72 | 400 | 134 | 540 | 2962 | Yes | 45.9 | 0.0 | 343 | 0.9379 |
| 4 | HFC-134a | 2.18 | 400 | 133 | 549 | 2962 | Yes | 58.7 | 0.0 | 441 | 0.9335 |
| 5 | HFC-236fa | 7.18 | 400 | 132 | 538 | 2962 | Yes | 52.8 | 0.0 | 400 | 0.9376 |
| 6 | HFC-245fa | 7.35 | 400 | 131 | 540 | 2962 | No | 61.6 | 10.4[1] | 470 | 0.9373 |
| 7 | HFC-245fa | 7.35 | 400 | 133 | 536 | 2962 | Yes | 75.2 | 0.0 | 565 | 0.9367 |
| 8 | HFC-245fa | 7.35 | 100 | 132 | 549 | 2962 | No | 55.4 | 0.4 | 420 | 0.9500 |

[1]During Run No. 6 the majority of the polymer removed from the reactor was free flowing; however, portions of the material formed weak agglomerates as a result of poor mixing, which is believed to have resulted from temporary and localized regions of high concentrations of co-catalyst, co-monomer, and hexene-1.

Example B

Preparation of a Metallocene-Type Transition Metal Catalyst

A bulky ligand metallocene-type catalyst system was prepared with dimethylsilyl-bis(tetrahydroindenyl)zirconium dichloride (Me$_2$Si(H$_4$Ind)$_2$ZrCl$_2$) available from Albemarle Corporation, Baton Rouge, La. and methylalumoxane, available from Albemarle, Baton Rouge, La. The (Me$_2$Si(H$_4$Ind)$_2$ZrCl$_2$) catalyst compound was combined with a 30 weight percent methylaluminoxane (MAO) in toluene and was supported on Crosfield ES-70 grade silica dehydrated at 600° C. having approximately 1.0 weight percent water Loss on Ignition (LOI). LOI is measured by determining the weight loss of the support material which has been heated and held at a temperature of about 1000° C. for about 22 hours. The Crosfield ES-70 grade silica has an average particle size of 40 microns and is available from Crosfield Limited, Warrington, England.

Comparative Examples 4 and 5 and Examples 9, 10, 11, 12, and 13 Polymerization Process The reactor used was a 2-liter Stainless Steel Autoclave, available from Autoclave Engineers (a division of Snap-Tite Corp. of Erie, Pa.). The reactor was outfitted with ports for injection of reagents and feed gas, and it had a double flight, helical impeller with a bottom auger (Autoclave Engineers) that provided the required mixing.

The catalyst used in the examples was a bulky ligand metallocene-type polymerization catalyst or catalyst system similar to that described in Example B. The scavenger used was triethylaluminum (TEAL). All experiments were carried out at a reaction temperature of 85° C.

For each experiment, the reactor was purged with nitrogen in preparation for addition of a seedbed of salt (NaCl). The autoclave head was removed and a predetermined quantity of NaCl was charged to the reactor. The reactor was sealed up and purged with nitrogen at 110° C. or higher for 16 to 64 hours to remove any adsorbed moisture from the salt seedbed and the reactor internals. During the nitrogen purge period, the internal agitator was operated between 200 to 250 RPM. The reactor was then cooled to ambient temperature and 4 ml of 1 Molar TEAL (Triethylaluminum co-catalyst) solution in hexane was injected into the reactor through a syringe injection port on the autoclave head. The isopentane, a condensable agent, (if used in the experiment) was added via a syringe. The reactor was then heated and maintained at 85° C. A predetermined quantity of catalyst suspended in a solution of hexane was pressured with nitrogen into the reactor from a catalyst charge tube. If a fluorinated hydrocarbon and/or a condensable fluid was used, it was added via a second charge tube in series behind the catalyst charge tube and nitrogen forced this material into the reactor along with the catalyst. Following the catalyst charge to the reactor, the total reactor pressure was measured and recorded between 492 kPa and 633 kPa. The reactor pressure was then increased to 2960 kPa with ethylene. As the reaction began, the reactants were consumed, the reactor total pressure was maintained with the addition of ethylene as needed. The reaction was quenched after 60 minutes by venting the reactor gas to a fume hood, and by cooling the remaining materials in the reactor to ambient temperature. For each experiment, the agitator was set and maintained at 250 RPM prior to the addition of the TEAL. (The stirrer was always on prior to the TEAL addition.)

When the reaction was completed, the polymer product and salt were poured from the autoclave and the polymer product was separated from the salt using a water wash. The polymer product was then removed from the water wash, vacuum filtered, and allowed to dry under ambient conditions. The polymer products were in the form of granular material.

Any salt and polymer that remained in the reactor following the pouring of product from the reactor was designated as foulant material. Most of the runs did not produce foulant material, but for those that did, the foulant was scrapped from the reactor walls and agitator, and then weighed and recorded in Table 2.

TABLE 2

| Run No. | Condensable Fluid or Condensing Agent Used | Amount of Condensable Fluid or Condensing Agent Added [g] | Seed Bed Wt. [g] | Catalyst Added [mg] | Reactor Pressure Following Catalyst Charge [kPa] | Reactor Pressure Following Ethylene Charge [kPa] | Total Polymer Produced [g] | Weight of Polymer Fouled[2] [g] | Productivity [g/g/hr] | Polymer Density[3] [g/cc] |
|---|---|---|---|---|---|---|---|---|---|---|
| C Ex 4 | None | 0 | 400 | 100 | 492 | 2962 | 24.7 | 0 | 247 | >0.964 |
| C Ex 5 | Isopentane | 3.72 | 400 | 99 | 584[1] | 2962 | 25.8 | 2.5 | 261 | >0.964 |
| 9 | HFC-134a | 3.00 | 400 | 99 | 603 | 2962 | 26.9 | 0 | 272 | >0.964 |
| 10 | HFC-245fa | 7.35 | 400 | 102 | 583 | 2962 | 27.9 | 0.58 | 274 | >0.964 |
| 11 | HFC-236fa | 7.42 | 400 | 103 | 613 | 2962 | 22.1 | 0 | 215 | >0.964 |
| 12 | PFB | 8.00 | 400 | 102 | 536 | 2962 | 22.1 | 5.74 | 217 | >0.964 |
| 13 | PFH | 10.20 | 400 | 100 | 633 | 2962 | 22.8 | 0 | 228 | >0.964 |

[1]Data was not collected for the reactor pressure following the catalyst charge for Run No. 10. The value of 584 kPa was estimated value based on historical data.
[2]During all of the runs, a majority of the polymer removed from the reactor was free flowing; however, portions of the material formed weak agglomerates. The total weight of these agglomerates including any salt contained with in the agglomerate was reported as "weight of polymer fouled."
[3]All polymer samples measured had a density greater than the maximum density measurement capability of the instrument.
Perfluorobutane (PFB)
Perfluorohexane (PFH)

Example A

Zeigler Natta Catalyst Preparation

A conventional-type transition metal catalyst was prepared from a mixture of a magnesium compound, $MgCl_2$, a titanium compound, $TiCl_3 \cdot 1/3AlCl_3$, and an electron donor, THF, and was supported on silica that was dehydrated at 600° C. A detailed description of the preparation procedure can be found in U.S. Pat. No. 4,710,538, which is herein incorporated by reference. The specific catalyst formulation used had a TNHAL/THF mole ratio of 0.27 and a DEAC/THF mole ratio of 0.50 where TNHAL is tri-n-hexyl aluminum and DEAC is diethyl aluminum chloride.

Example B

Metallocene Catalyst Preparation

The catalyst used in these experiments was the bulky ligand metallocene-type catalyst dimethylsilyl-bis(tetrahydroindenyl)zirconium dichloride $(Me_2Si(H_4Ind)_2ZrCl_2)$ available from Albemarle Corporation, Baton Rouge, La. The $(Me_2Si(H_4Ind)_2ZrCl_2)$ catalyst compound was combined with a 30 weight percent methylaluminoxane (MAO) in toluene (available from Albemarle, Baton Rouge, La.) and was supported on Crosfield ES-70 grade silica dehydrated at 600° C. having approximately 1.0 weight percent water Loss on Ignition (LOI). LOI is measured by determining the weight loss of the support material which has been heated and held at a temperature of about 1000° C. for about 22 hours. The Crosfield ES-70 grade silica has an average particle size of 40 microns and is available from Crosfield Limited, Warrington, England.

Examples C, D, E and F

A series of tests were performed in a medium scale gas phase reactor to determine the maximum sustainable Induced Condensing Agent (ICA) concentration that could be achieved while maintaining stable fluidization. In each test the reactor started out with no ICA. The total reactor pressure was maintained at 2169 kPa and an operating temperature of 85° C. Once operations stabilized and the unit was operating in steady state conditions, the ICA was introduced into the reactor. The ICA concentration was then ramped up to a target set-point or until the polymer became sticky and it was no longer possible to remove polymer product from the reactor using standard operating procedures.

All medium scale gas phase tests were done in a fluidized bed reactor equipped with devices for temperature control, catalyst feeding or injection equipment, GC analyzer for monitoring and controlling monomer and gas feeds and equipment for polymer sampling and collecting. The reactor consisted of a 6" diameter bed section increasing to 10" at the reactor top. Gas entered the fluidized bed through a perforated distributor plate. The reactor was also equipped with a product discharge system for removing polymer product from the reactor. A description of the operating conditions for the tests is given in Table A.

Example C

In this example, the reactor was operated with the Ziegler Natta catalyst of Example A with no ICA. The gas phase reactor reached steady state producing a polymer product with a 0.917 g/cc density and a melt index of 1.21 dg/min. Quality fluidization was maintained throughout the run and no problems were encountered with discharging polymer product from the reactor.

Example D

Similar reactor conditions were employed as in Example C except that isopentane was used to as a conventional ICA. The isopentane concentration was first ramped up to 1.5 mole % and held for 24 hours. Following the 24 hour hold period, the isopentane was further ramped up to between 6 and 7 mole % over a 7 hour period. Above this ICA concentration it was not possible to remove polymer product from the reactor using normal operating procedures. At ICA concentrations lower than 6 to 7 mole %, polymer product could be removed from the reactor using normal operating procedures.

Example E

HFC-245fa was used as the ICA with the Ziegler Natta catalyst of Example A. Other reactor conditions were similar to those in Example C and D. The HFC-245fa concentration was ramped up from 0 mole % to 20.7 mole % over a 48 hour period. The initial ramp up to 4 mole % was carried out over 24 hours and the ramp up from 4 mole % to 20.7 mole % was carried out over the remaining 24 hours. The maximum ICA concentration obtained was measured at 20.7 mole %. This was the highest concentration attempted for this example. At the time an ICA concentration of 20.7 mole % was reached, unrelated technically difficulties forced a shut-down of the unit. At ICA concentrations as high as 20.7 mole %, polymer product could be removed from the reactor using normal operating procedures and no polymer stickiness was observed.

Example F

HFC-245fa was used as the ICA with the metallocene catalyst of Example B. The HFC-245fa concentration was ramped up to 17.8 mole % over a 30 hour period. The HFC-245fa concentration was first ramped up to between 1 mole % and 2 mole % and held for 14 hours. Following the 14 hour hold period, the HFC-245fa concentration was further ramped up to 17.8 mole % over a 16 hour period. This concentration was then held for over 2 hours and was the maximum ICA concentration measured for this example. Throughout this entire test polymer product could be removed from the reactor using normal operating procedures and no polymer stickiness was observed.

TABLE A

|  | Example | | | |
| --- | --- | --- | --- | --- |
|  | Example C | Example D | Example E | Example F |
| Catalyst | A | A | A | B |
| ICA | None | Isopentane | HFC-245fa | HFC-245fa |
| Reactor Bed Temperature (° C.)* | 85 | 85 | 85 | 79 |
| Reactor Pressure (kPa)* | 2169 | 2169 | 2169 | 2169 |
| Ethylene Partial Pressure (kPa)* | 456 | 453 | 464 | 764 |
| Hexene/Ethylene gas ratio (mole %/mole %)* | 0.116 | 0.071 | 0.101 | 0.034 |
| Hydrogen/Ethylene gas ratio (mole %/mole %)* | 0.191 | 0.196 | 0.193 | 2.9E-04 |
| Triethylaluminum Feed (g/hr)* | 11.8 | 11.9 | 13.5 | 10.0 |
| Production Rate (g/hr)* | 421 | 645 | 380 | 287 |
| Bed Weight (g)* | 1938 | 1933 | 1849 | 1933 |
| Residence Time (hr)* | 4.6 | 3.0 | 4.9 | 6.7 |
| Superficial Gas Velocity (m/s)* | 0.48 | 0.50 | 0.50 | 0.50 |
| Product Density (g/cc) | 0.917 | 0.916 | 0.922 | 0.922 |
| Product Melt Index-I2, (dg/min) | 1.21 | 1.23 | 0.92 | 1.48 |
| Maximum ICA Concentration Achieved under Stable Fluid Bed Operations (mole %) | N/A | 6 to 7 | 20.7 | 17.8 |

*Four hour average.

Discussion of Examples D and E

Examples D and E illustrate the effect of using a relatively insoluble HFC as the induced condensing agent (ICA) in place of conventional hydrocarbons, such as isopentane. In Example D, the polymer in the fluid bed became sticky for isopentane concentrations above 6-7 mole % (130–152 kPa). Using HFC-245fa in place of the isopentane in Example E allowed a much higher ICA concentration of 20.7 mole % (449 kPa), without inducing stickiness or agglomeration in the fluid bed. This higher ICA concentration with the HFC-245fa would allow higher reactor dew point temperatures, higher condensing levels in condensed mode operation, and higher reactor production rates.

While the present invention has been described and illustrated by reference to particular embodiments, those of ordinary skill in the art will appreciate that the invention lends itself to variations not necessarily illustrated herein. For example, It is within the scope of this invention that the gas phase process of the invention can be operated in series, with two or more reactors, each reactor operating in a gas phase or one of the reactors operating in a slurry phase. For this reason, then, reference should be made solely to the appended claims for purposes of determining the true scope of the present invention.

All documents described herein are incorporated by reference herein, including any priority documents and/or testing procedures, except to the extent they are inconsistent with this specification.

The invention claimed is:

1. A gas phase process for polymerizing one or more hydrocarbon monomer(s) in a reactor in the presence of a catalyst system and a fluorinated hydrocarbon, where the fluorinated hydrocarbon is present at a partial pressure of 6.9 to 3448 kPa in the reactor and the reactor temperature is from 30 to 120° C., wherein the catalyst system comprises a Group 3 to 12 metal and the molar ratio of the fluorinated hydrocarbon to the metal of the catalyst system is from 2000-3500:1.

2. The gas phase process of claim 1 wherein the fluorinated hydrocarbon consists essentially of at least one carbon atom and at least one fluorine atom, and optionally at least one hydrogen atom.

3. The gas phase process of claim 1 wherein the fluorinated hydrocarbon is represented by the formula:

$$C_xH_yF_z$$

wherein x is an integer from 1 to 40, and y is an integer greater than or equal to 0 and z is an integer of at least 1.

4. The gas phase process of claim 3 wherein y and z are integers equal to or greater than 1.

5. The gas phase process of claim 3 wherein x is an integer in the range of from 1 to 10 and z is 2 or more.

6. A gas phase process for polymerizing one or more hydrocarbon monomer(s) in a reactor in the presence of a catalyst system and a fluorinated hydrocarbon, where the fluorinated hydrocarbon is present at a partial pressure of 6.9 to 3448 kPa in the reactor and the reactor temperature is from 30 to 120° C., wherein the catalyst system is a bulky ligand metallocene-type catalyst system, wherein the catalyst system comprises a Group 3 to 12 metal, and the molar ratio of the fluorinated hydrocarbon to the metal of the catalyst system is from 2000-3500:1.

7. The gas phase process of claim 1 wherein the catalyst system is a Ziegler-Natta-type catalyst system.

8. A gas phase process for polymerizing one or more hydrocarbon monomer(s) in a reactor in the presence of a catalyst system and a fluorinated hydrocarbon, where the fluorinated hydrocarbon is present at a partial pressure of 6.9 to 3448 kPa in the reactor and the reactor temperature is from 30 to 120° C., wherein the catalyst system is a Phillips-type catalyst system, wherein the catalyst system comprises a Group 3 to 12 metal, and the molar ratio of the fluorinated hydrocarbon to the metal of the catalyst system is from 2000-3500:1.

9. The gas phase process of claim 1 wherein the fluorinated hydrocarbon is one or more of: 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, or 2,3-dihydrodecafluoropentane.

10. The gas phase process of claim 1 wherein the fluorinated hydrocarbon has a molecular weight (MW) greater than 90 a.m.u.

11. The gas phase process of claim 1 wherein the fluorinated hydrocarbon has normal boiling point in the range of from about −50° C. up to 110° C.

12. The gas phase process of claim 1 wherein the fluorinated hydrocarbon has a liquid density at 20° C. (g/cc) greater than 1 g/cc.

13. The gas phase process of claim 1 wherein the fluorinated hydrocarbon has a ΔH Vaporization in the range between 100 kJ/kg to less than 300kJ/kg.

14. A gas phase process for polymerizing one or more hydrocarbon monomer(s) in a reactor in the presence of a catalyst system and a fluorinated hydrocarbon, where the fluorinated hydrocarbon is present at a partial pressure of 6.9 to 3448 kPa in the reactor and the reactor temperature is from 30 to 120° C., wherein the catalyst system comprises a Group 3 through 12 metal, and the molar ratio of the fluorinated hydrocarbon to metal is greater than 10,000:1.

15. The gas phase process of claim 1 wherein the fluorinated hydrocarbon has an Mw greater than 100 a.m.u, a ΔH Vaporization in the range of from 100 kj/kg to less than 250 kj/kg, and optionally, a liquid density at 20° C. of greater than 1.10 g/cc.

16. The gas phase process of claim 1 wherein the fluorinated hydrocarbon has a liquid density at 20° C. of greater than 1.10 g/cc, a normal boiling point in the range of from about −50° C. up to 85° C., and optionally, a ΔH Vaporization in the range of from 120 kj/kg to less than 250 kj/kg.

17. The gas phase process of claim 1 wherein the one or more monomer(s) are selected from one or more of the group consisting of ethylene, propylene, butene-1, 4-methyl-pentene-1, hexene-1, and octene-1.

18. The gas phase process of claim 1 wherein the gas phase process is operating in a condensed mode.

19. The gas phase process of claim 1 wherein the gas phase process has operating conditions comprising a pressure in the range of from 1379 kPa to 2759 kPa, a polymerization temperature in the range of from 70° C. to 110° C., and a partial pressure of fluorinated hydrocarbon in the range of from 35 kPa to 690 kPa.

20. The gas phase process of claim 1 where the process occurs in a fluidized bed reactor, the process is operating in a condensed mode in which a liquid and a gas are introduced to the fluidized bed reactor having a fluidizing medium, wherein the level of a fluorinated hydrocarbon is greater than 1 weight percent based on the total weight of the liquid and gas entering the fluidized bed reactor.

21. The gas phase process of claim 20 wherein the level of the fluorinated hydrocarbon is greater than 10 weight percent of the total weight of the liquid and gas entering the fluidized bed reactor.

22. The gas phase process of claim 20 wherein the level of the fluorinated hydrocarbon is from 15 weight percent to 60 weight percent of the total weight of the liquid and gas entering the fluidized bed reactor.

23. The gas phase process of claim 20 wherein the gas phase process has operating conditions comprising a partial pressure of fluorinated hydrocarbon in the range of from 35 kPa to 690 kPa.

24. The process of claim 1 wherein the process is a continuous process for polymerizing monomer(s) in a reactor, said process comprising the steps of:
(a) introducing a recycle stream into the reactor, the recycle stream comprising one or more monomer(s);
(b) introducing a polymerization catalyst and a condensable fluid comprising fluorinated hydrocarbon into the reactor;
(c) withdrawing the recycle stream from the reactor;
(d) cooling the recycle stream to form a gas phase and a liquid phase;
(e) reintroducing the gas phase and the liquid phase, separately, and/or in combination, into the reactor;
(f) introducing into the reactor additional monomer(s) to replace the monomer(s) polymerized; and
(g) withdrawing a polymer from the reactor.

25. The process of claim 24 wherein the condensable fluid is introduced in a concentration greater than 1 mole percent based on the total moles of gas in the reactor.

26. The process of claim 24 wherein the condensable fluid is introduced in a concentration greater than 2 mole percent based on the total moles of gas in the reactor.

27. The process of claim 24 wherein the condensable fluid is introduced in a concentration greater than 5 mole percent based on the total moles of gas in the reactor.

28. The process of claim 24 wherein the condensable fluid is introduced in a concentration greater than 7 mole percent based on the total moles of gas in the reactor.

29. The process of claim 24 wherein the process has operating conditions comprising a partial pressure of fluorinated hydrocarbon in the range of from 6.9 kPa to 3448 kPa.

30. The process of claim 24 wherein the process has operating conditions comprising a partial pressure of fluorinated hydrocarbon in the range of from 13.8 kPa to 1724 kPa.

31. The process of claim 24 wherein in step(g) more than 22,700 Kg/hr of the polymer per hour is being withdrawn from the reactor.

32. The process of claim 24 wherein the catalyst system is a bulky ligand metallocene-type catalyst system, the polymer product has a density in the range of from about 0.915 g/cc to about 0.950 g/cc, and the process has a polymer production rate greater than 40,000 kg/hour.

33. The gas phase process of claim 32 wherein the process comprises a fluidizing medium that is introduced to the reactor, and the process is operating in a condensed mode wherein the level of condensing or condensed is greater than 15 weight percent, based on the total weight of fluidizing medium being introduced into the reactor.

34. The gas phase process of claim 33 wherein the level of condensed is greater than 32 weight percent based on the total weight of fluidizing medium being introduced into the reactor.

35. The gas phase process of claim 34 wherein the level of condensed is greater than 50 weight percent based on the total weight of fluidizing medium being introduced into the reactor.

36. The gas phase process of claim 33 wherein a partial pressure of the fluorinated hydrocarbon in the reactor is in the range of from 207 kPa to 690 kPa.

37. The gas phase process of claim 36 wherein a partial pressure of the fluorinated hydrocarbon in the reactor is in the range of from 241 kPa to 621 kPa.

38. The gas phase process of claim 33 wherein the polymer product has a density in the range of from about 0.915 g/cc to 0.945 g/cc.

39. The gas phase process of claim 32 wherein the polymer product has a density in the range of from about 0.915 g/cc to 0.940 g/cc.

40. The gas phase process of claim 32 wherein the polymer production rate is greater than 70,000 kg/hour.

41. A gas phase process for polymerizing one or more hydrocarbon monomer(s) in a reactor in the presence of a catalyst system and a fluorinated hydrocarbon, where the fluorinated hydrocarbon is present in the reactor at 1 weight percent or more (based upon the total weight of liquid and gas entering the reactor) and the reactor temperature is from 30 to 120° C., wherein the catalyst system comprises a Group 3 to 12 metal, and the molar ratio of the fluorinated hydrocarbon to the metal of the catalyst system is from 2000-3500:1.

42. The gas phase process of claim 41 wherein the fluorinated hydrocarbon consists essentially of at least one carbon atom and at least one fluorine atom, and optionally at least one hydrogen atom.

43. The gas phase process of claim 41 wherein the fluorinated hydrocarbon is represented by the formula:

wherein x is an integer from 1 to 40, and y is an integer greater than or equal to 0 and z is an integer of at least 1.

44. The gas phase process of claim 43 wherein y and z are integers equal to or greater than 1.

45. The gas phase process of claim 43 wherein x is an integer in the range of from 1 to 10 and z is 2 or more.

46. A gas phase process for polymerizing one or more hydrocarbon monomer(s) in a reactor in the presence of a catalyst system and a fluorinated hydrocarbon, where the fluorinated hydrocarbon is present in the reactor at 1 weight percent or more (based upon the total weight of liquid and gas entering the reactor) and the reactor temperature is from 30 to 120° C., wherein the catalyst system comprises a Group 3 through 12 metal, and the molar ratio of the fluorinated hydrocarbon to metal is greater than 500:1.

47. The gas phase process of claim 41 wherein the catalyst system is a Ziegler-Natta-type catalyst system.

48. A gas phase process for polymerizing one or more hydrocarbon monomer(s) in a reactor in the presence of a catalyst system and a fluorinated hydrocarbon, where the fluorinated hydrocarbon is present in the reactor at 1 weight percent or more (based upon the total weight of liquid and gas entering the reactor) and the reactor temperature is from 30 to 120° C., wherein the catalyst system is a bulky ligand metallocene-type catalyst system, wherein the catalyst system comprises a Group 3 to 12 metal, and the molar ratio of the fluorinated hydrocarbon to the metal of the catalyst system is from 2000-3500:1.

49. The gas phase process of claim 41 wherein the fluorinated hydrocarbon is selected from one or more of the group consisting of: 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane.

50. The gas phase process of claim 41 wherein the fluorinated hydrocarbon has normal boiling point in the range of from about −50° C. up to 110° C.

51. The gas phase process of claim 41 wherein the fluorinated hydrocarbon has a liquid density @20° C.(g/cc) greater than 1 g/cc.

52. The gas phase process of claim 41 wherein the fluorinated hydrocarbon has a ΔH Vaporization in the range between 100 kJ/kg to less than 300 kJ/kg.

53. A gas phase process for polymerizing one or more hydrocarbon monomer(s) in a reactor in the presence of a catalyst system and a fluorinated hydrocarbon, where the fluorinated hydrocarbon is present in the reactor at a 1 weight percent or more (based upon the total weight of liquid and gas entering the reactor) and the reactor temperature is from 30 to 120° C., wherein the catalyst system comprises a Group 3 through 12 metal, and the molar ratio of the fluorinated hydrocarbon to metal is in the range of from 500:1 to 10,000:1.

54. The gas phase process of claim 41 wherein the fluorinated hydrocarbon has a MW greater than 100 a.m.u, and a ΔH Vaporization in the range of from 100 kj/kg to less than 300 kj/kg, and optionally a liquid density greater than 1.00 g/cc.

55. The gas phase process of claim 41 wherein the fluorinated hydrocarbon has a liquid density greater than 1.10 g/cc, a normal boiling point in the range of from about −50° C. up to 85° C., and optionally a ΔH Vaporization in the range of from 120 kj/kg to less than 250 kj/kg.

56. The gas phase process of claim 41 wherein the one or more monomer(s) are selected from one or more of the group consisting of ethylene, propylene, butene-1, 4-methyl-pentene-1, hexene-1, and octene-1.

57. The gas phase process of claim 41 wherein the gas phase process is a operating in a condensed mode.

58. The gas phase process of claim 41 wherein the gas phase process has operating conditions comprising a pressure in the range of from about 200 psig (1379 kPa) to about 400 psig (2759 kPa), a polymerization temperature in the range of from about 70° C. to about 110° C., and a partial pressure of fluorinated hydrocarbon in the range of from 5 psia (35 kPa) to about 100 psia (690 kPa).

59. A continuous process for polymerizing monomer(s) in a reactor, said process comprising the steps of:
(a) introducing a recycle stream into the reactor, the recycle stream comprising one or more monomer(s);
(b) introducing a polymerization catalyst and a condensable fluid comprising fluorinated hydrocarbon into the reactor, where the fluorinated hydrocarbon is present at 1 weight percent or more (based upon the total weight of the liquid and gas entering the reactor) and the reactor temperature is between 30 and 120° C., wherein the catalyst comprises a Group 3 to Group 12 metal, and the molar ratio of the fluorinated hydrocarbon to the metal of the catalyst system is from 2000-3500:1;
(c) withdrawing the recycle stream from the reactor;
(d) cooling the recycle stream to form a gas phase and a liquid phase;
(e) reintroducing the gas phase and the liquid phase, separately, and/or in combination, into the reactor;

(f) introducing into the reactor additional monomer(s) to replace the monomer(s) polymerized; and (g) withdrawing a polymer from the reactor.

60. The gas phase process of claim 1 where the fluorinated hydrocarbon is present at a partial pressure of 13.8 to 3448 kPa in the reactor.

61. The gas phase process of claim 1 where the fluorinated hydrocarbon is present at a partial pressure of 34.5 to 3448 kPa in the reactor.

62. The gas phase process of claim 41 wherein the fluorinated hydrocarbon is present at 5 mole % or more, based upon the moles of fluorinated hydrocarbon, hydrocarbon solvent and monomers present in the reactor.

63. The gas phase process of claim 41 wherein the fluorinated hydrocarbon is present at 10 mole % or more, based upon the moles of fluorinated hydrocarbon, hydrocarbon solvent and monomers present in the reactor.

64. The gas phase process of claim 41 wherein the fluorinated hydrocarbon is present at 20 mole % or more, based upon the moles of fluorinated hydrocarbon, hydrocarbon solvent and monomers present in the reactor.

* * * * *